(12) United States Patent
Ishida et al.

(10) Patent No.: US 7,872,079 B2
(45) Date of Patent: Jan. 18, 2011

(54) NAPHTHOXAZINE COMPOSITION

(75) Inventors: Hatsuo Ishida, Shaker Heights, OH (US); Masanori Nakamura, Tsukuba (JP)

(73) Assignees: Sekisui Chemical Co., Ltd., Osaka (JP); Case Western Reserve University, Cleveland, OH (US)

( * ) Notice: Subject to any disclaimer, the term of this patent is extended or adjusted under 35 U.S.C. 154(b) by 312 days.

(21) Appl. No.: 12/054,182

(22) Filed: Mar. 24, 2008

(65) Prior Publication Data
US 2009/0240006 A1 Sep. 24, 2009

(51) Int. Cl.
*C08L 63/00* (2006.01)
*B32B 27/26* (2006.01)
*B32B 27/38* (2006.01)

(52) U.S. Cl. .................. 525/523; 525/534; 525/540

(58) Field of Classification Search .................. None
See application file for complete search history.

(56) References Cited

U.S. PATENT DOCUMENTS

| | | | | |
|---|---|---|---|---|
| 5,900,447 A * | 5/1999 | Ishida | ................. | 524/404 |
| 6,900,269 B2 * | 5/2005 | Hwang et al. | ............ | 525/109 |
| 7,084,194 B2 * | 8/2006 | Hwang et al. | ............ | 523/435 |
| 7,202,359 B2 * | 4/2007 | Hwang et al. | ............ | 544/73 |

OTHER PUBLICATIONS

Shyan Bob Shen, et al.; "Synthesis and Characterization of Polyfunctional Naphthoxazines and Related Polymers"; Journal of Applied Polymer Science; vol. 61; pp. 1595-1605 (1996).

* cited by examiner

*Primary Examiner*—Michael J Feely
(74) *Attorney, Agent, or Firm*—Sughrue Mion, PLLC

(57) ABSTRACT

The present invention is intended to provide a novel naphthoxazine composition having a smaller amount of volatile components (weight reduction) upon curing, and is to provide a naphthoxazine composition characterized in that a naphthoxazine compound having a phenolic hydroxyl group in the same molecule is further added with an epoxy resin, and a molded product obtained by molding the naphthoxazine composition.

6 Claims, 3 Drawing Sheets

NAPHTHOXAZINE COMPOSITION

BACKGROUND OF THE INVENTION

1. Field of the Invention

The present invention relates to a novel naphthoxazine composition having a smaller amount of volatile components (weight reduction) upon curing.

2. Description of the Related Art

A naphthoxazine composition forms a hard and highly heat resistant resin when heated. Especially, due to its excellent char yield (rate of carbonization), the resulting resin is expected to have wide applications not only as a material for the use in electronic and electric instruments, but also as a material for the use in the fields of space and aeronautics as well as in the fields of electronic telecommunications.

For example, Shyan and his colleagues synthesized numerous species of naphthoxazine, and reported their properties (Journal of Applied Polymer Science, vol. 61, 1595-1605 (1996)).

In particular, a naphthoxazine prepared using 1,5-dihydroxynaphthalene as a raw material can yield a cured product without any void, and the cured product has a glass transition temperature as high as 305° C. and a char yield of 67%, thus having properties superior to those of other high performance resins such as epoxies or bismaleimides.

However, the resin has a serious defect of being accompanied by large weight reduction upon curing by heating.

SUMMARY OF THE INVENTION

Under such circumstances, an object that the present invention intends to solve is to provide a novel naphthoxazine composition having a smaller amount of volatile components (weight reduction) during curing.

The inventors of the present invention devotedly conducted research on the above-described problems, and as a result, found that in the case where naphthoxazine additionally has a phenol group in the same molecule, weight reduction of naphthoxazine upon curing is suppressed.

In addition, the inventors found that when a composition having an epoxy resin incorporated as an additive is prepared, weight reduction upon curing can be made almost absent, thus completing the invention.

Specifically, the invention is as follows.

A novel naphthoxazine composition comprising a naphthoxazine compound having a phenolic hydroxyl group in the same molecule, and an epoxy resin added thereto.

The novel naphthoxazine composition obtained by the invention has a low melt viscosity, and thus is easily moldable.

A molded product obtained by molding the composition under heating has excellent heat resistance and mechanical strength, and thus can be suitably used in electric and electronic parts, automobile parts, copper clad laminate boards, printed boards, refractory coatings, matrix resin for composite materials, and the like.

DESCRIPTION OF THE PREFERRED EMBODIMENTS

Figure 1:
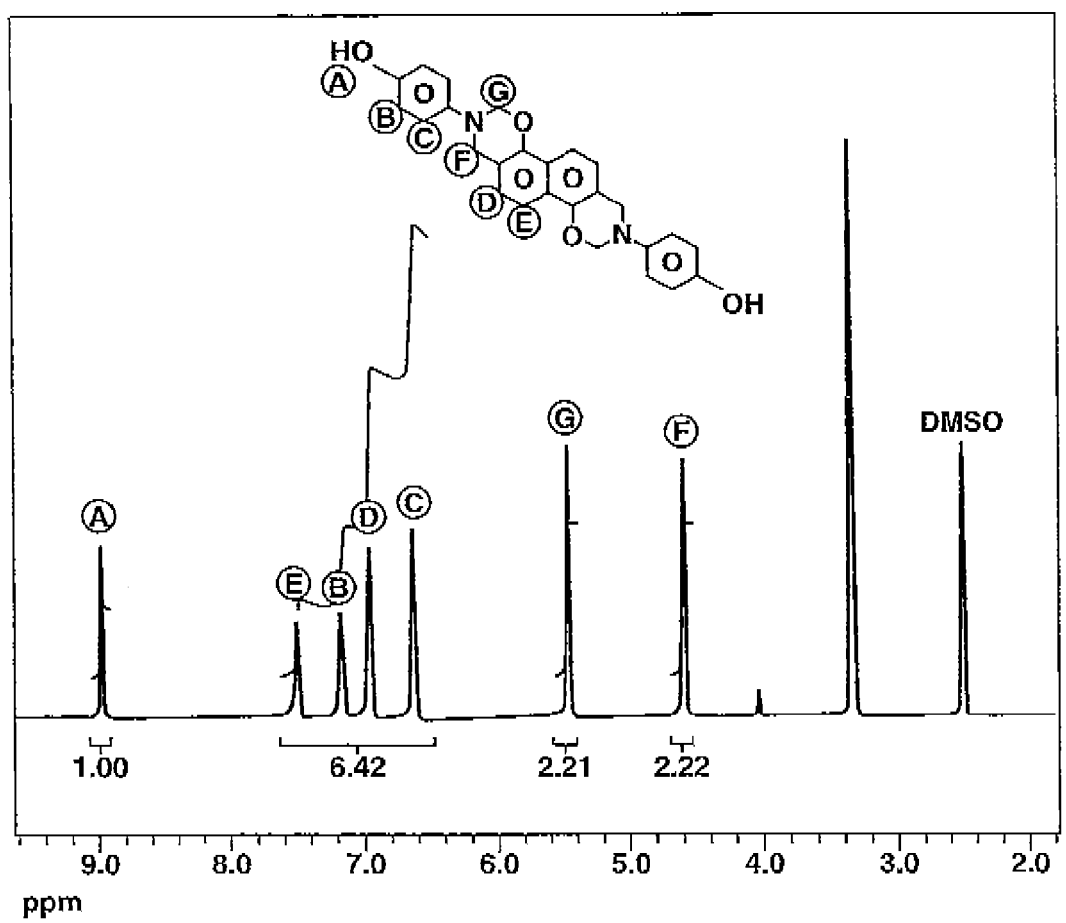
FIG. 1 shows a $^1$H-NMR spectrum of the novel naphthoxazine compound of Example 1.

Exemplary structures of the novel naphthoxazine compound of the invention are presented in the following (partly include anthraoxazines).

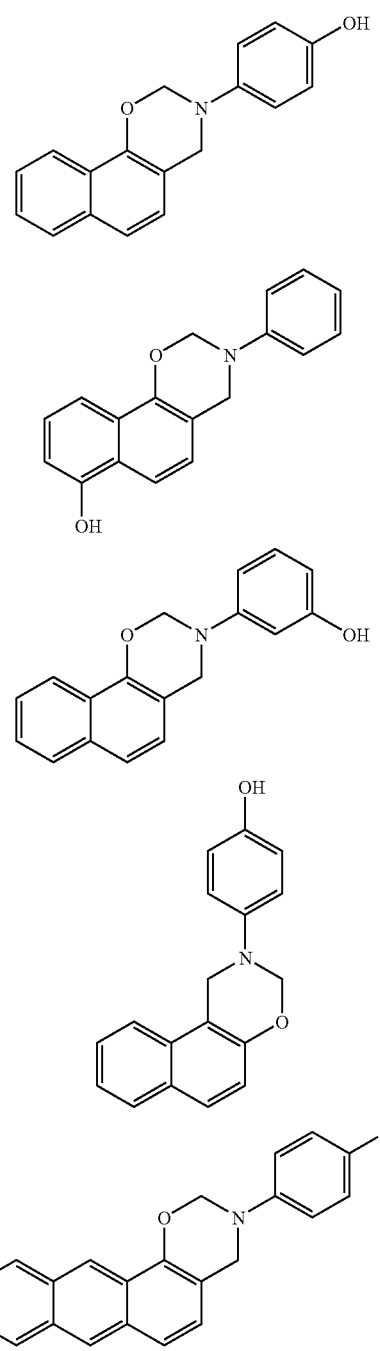

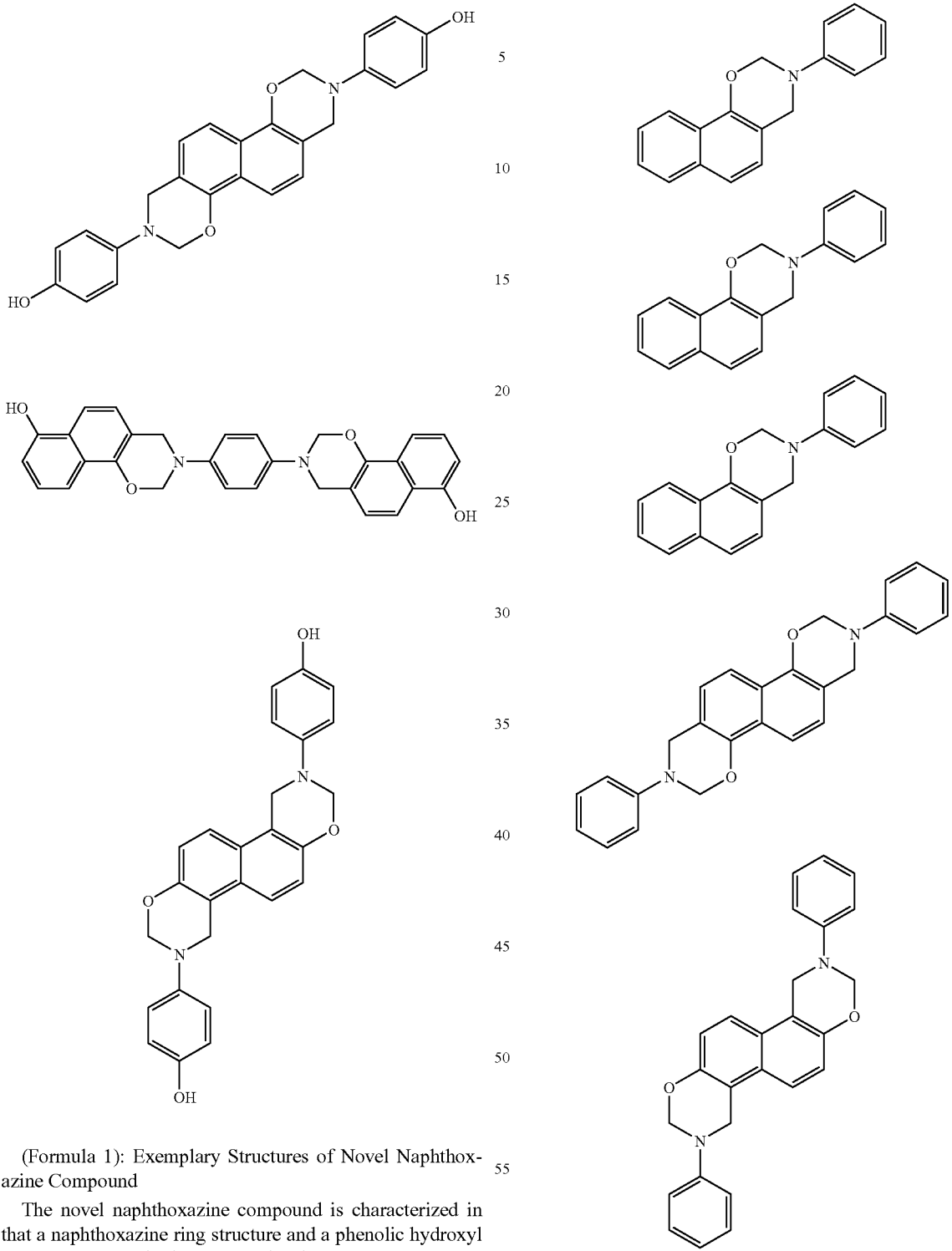

(Formula 1): Exemplary Structures of Novel Naphthoxazine Compound

The novel naphthoxazine compound is characterized in that a naphthoxazine ring structure and a phenolic hydroxyl group are present in the same molecule.

The structure of conventional naphthoxazine compounds are, for example, based on the following structures. However, since the compounds do not contain a phenolic hydroxyl group in the molecule, when the naphthoxazine ring is subjected to ring-opening polymerization, cross-linking does not occur smoothly, and weight reduction caused by decomposition as a side reaction is likely to occur.

(Formula 2): Exemplary Structures of Conventional Naphthoxazine Compounds

Since the novel naphthoxazine compound has a phenolic hydroxyl group in the molecule, a cross-linking reaction occurs smoothly, and decomposition can be suppressed. However, weight reduction cannot be completely inhibited. Thus, the inventors of the invention added an epoxy resin to this novel naphthoxazine compound, thus completing the invention as a novel naphthoxazine composition.

In regard to the epoxy resin, although the mechanism for suppressing decomposition is not yet clear, it is believed that a mechanism is effected in which the epoxy group reacts with the hydrogen of an amino group generated during decomposition, thus avoiding any decrease in the molecular weight.

The epoxy resin is not particularly limited, and any epoxy resin selected from glycidyl ether type epoxy resins, glycidyl ester type epoxy resins, glycidylamine type epoxy resins, cyclic aliphatic epoxy resins and the like, may be used effectively.

[Method for Producing Novel Naphthoxazine Compound]

The imide-naphthoxazine copolymer of the invention may be produced by any method, and for example, can be produced according to the following scheme.

Formula (3): Example of Fundamental Synthesis Scheme for Novel Naphthoxazine Compound

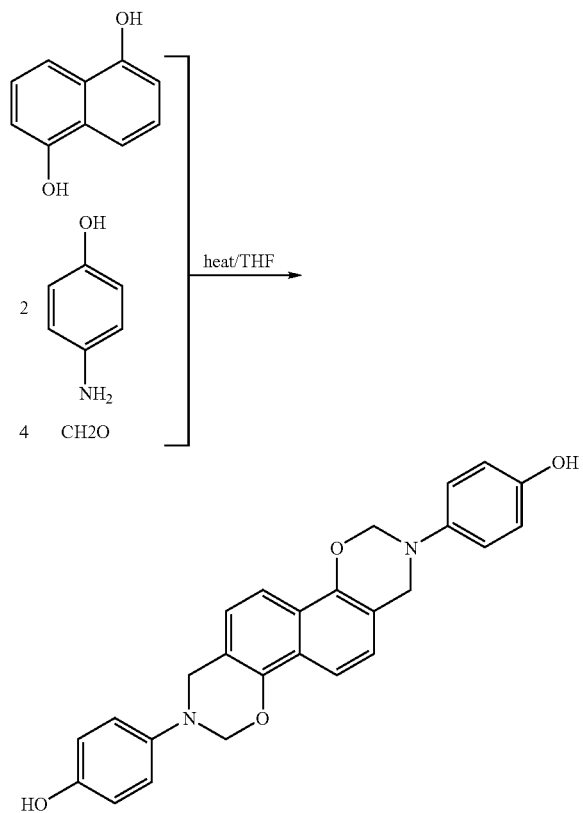

Basically, the copolymer can be synthesized by mixing three components of a hydroxynaphthalene, an amine and formaldehyde, adding a solvent if necessary, and overheating the mixture while stirring.

As the hydroxynaphthalene, α-naphthol, β-naphthol, 1,5-dihydroxynaphthalene, 2,6-dihydroxynaphthalene, 2,7-dihydroxynaphthalene or the like is used.

As the amine, aminophenol is fundamentally used so as to provide a phenolic hydroxyl group to the synthesis product. As the aminophenol, p-aminophenol, m-aminophenol or o-aminophenol is used.

In the case where, for example, aniline having no hydroxyl group or the like is used as the amine, a measure may be taken by remaining one phenolic hydroxyl group of dihydroxynaphthalene by reducing the amount of addition of the amine.

Formaldehyde can be used in the form of paraformaldehyde which is a polymer, or in the form of formalin which is an aqueous solution.

With regard to the mixing ratio, it is preferable to mix amine such that 1 mole of an amine functional group is used based on 1 mole of the hydroxyl group of hydroxynaphthalene, and to mix 2 moles of formaldehyde (in accordance with the stoichiometric ratio).

The solvent used according to necessity is not particularly limited as long as it dissolves the starting raw material to some extent, and does not inhibit the reaction. Examples thereof include N-methylpyrrolidone, dimethylacetamide, dimethylsulfoxide, dimethylformamide, dioxane, tetrahydrofuran and the like, and preferred is tetrahydrofuran which has a low boiling point and is easy to use.

The reaction temperature and the reaction time are not particularly limited, but the reaction may be carried out typically at a temperature of about 50° C. to 130° C. for 10 minutes to 1 hour. According to the invention, it is particularly preferable to perform the reaction at 70° C. for about 30 minutes using tetrahydrofuran as the solvent, from the viewpoint of preventing any side reactions during the reaction.

The compound can be precipitated by adding the solution obtained after the reaction to, for example, a large amount of a poor solvent such as water, and when the precipitate is separated and dried, the desired novel naphthoxazine compound can be obtained.

Production of Novel Naphthoxazine Composition

The novel naphthoxazine composition is characterized in that an epoxy resin is added to a naphthoxazine compound, as previously described, and for example, can be produced by mechanically mixing the novel naphthoxazine compound (powdered) obtained above with an epoxy resin (typically, a liquid of high viscosity).

The method of mixing is not particularly limited, and a mixing machine such as a super mixer, a stone mill machine or a pressurized kneader can be applied.

The mixing proportion of the novel naphthoxazine compound and the epoxy resin is not particularly limited, but the ratio of the mole number of naphthoxazine functional group in the novel naphthoxazine compound/mole number of epoxy functional group in the epoxy resin is preferably 0.3 to 3.0, and more preferably 0.5 to 2.0.

If this ratio is too small, heat resistance or rigidity may be impaired. If the ratio is too large, the weight reduction upon curing by heating is thought to be increased.

Molding of Novel Naphthoxazine Composition

The method of molding the novel naphthoxazine composition is not particularly limited, and a molded product can be obtained by charging the novel naphthoxazine composition into a desired mold, and then heating the composition at a temperature of 120 to 200° C. for 30 minutes to 2 hours.

Since the novel naphthoxazine composition of the invention has a naphthoxazine ring in the structure, when the composition is heated, a ring opening cross-linking reaction occurs, and a strong cured resin (molded product) is formed.

The novel naphthoxazine composition of the invention can be easily subjected to molding such as film formation, and the resulting molded product has excellent heat resistance and mechanical strength. Therefore, the composition can be suitably used in electric and electronic parts, automobile parts, copper clad laminate boards, refractory coatings, matrix resins for composite materials, and the like.

EXAMPLES

Hereinafter, the invention will be described in more detail with reference to Examples, but the invention is not intended to be limited to the Examples described below. In addition, the term percent means percent by mass in the following.

[Measurement Methods]

The methods for measuring properties in the present specification are as follows.

(1) Nuclear Magnetic Resonance Spectrum (NMR Spectrum)

$^1$H-NMR (600 MHz) manufactured by Varian Inova, Inc.

Deuterated dimethylsulfoxide was used, integration of 256 cycles, relation time of 10 seconds (2) Weight Reduction Upon Heat Curing The weight reduction was measured using a high resolution 2950 thermal gravimetric analyzer (TA Instrument, Inc.), at a rate of temperature elevation of 5° C./min.

Example 1

Synthesis of Novel Naphthoxazine Compound

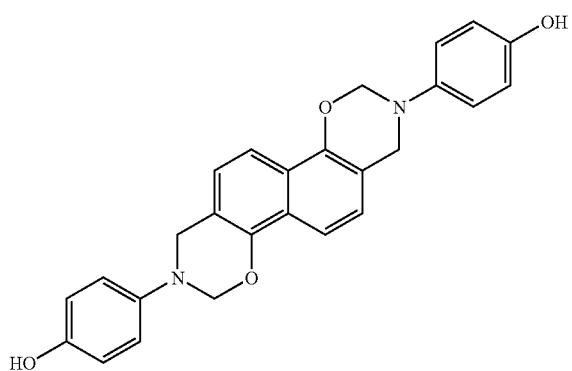

To a round-bottom flask having a capacity of 300 cc equipped with a reflux unit, 16 g of 1,5-dihydroxynaphthalene (Wako Pure Chemical Industries, Ltd.), 21.8 g of 4-aminophenol, 32.4 g of a 37% aqueous formaldehyde solution, and 300 g of tetrahydrofuran were added, and the mixture was dissolved by heating in an oil bath set at 30° C.

The temperature of the oil bath was elevated up to 90° C., and the reaction was continued for 30 minutes while refluxing the solvent. Then, the reaction system was cooled to room temperature.

This solution was added dropwise to 2 liters of cold water under vigorously stirring. Precipitated solids were filtered, and then washed with methanol. The resulting powder was dried in vacuum for 24 hours in a vacuum oven heated to 40° C.

An NMR spectrum of the obtained novel naphthoxazine compound is shown in FIG. 1

Typical resonance absorption of the methylene group of naphthoxazine is seen near 4.6 ppm and 5.4 ppm (in order of benzene-CH$_2$—N, N—CH$_2$—O).

Furthermore, the integral values for other absorption peaks also coincide with the values estimated from the molecular formula of the compound.

[Preparation of Novel Naphthoxazine Composition]

10 g of the novel naphthoxazine compound produced in the above was mixed with 10 g of a glycidyl ether type epoxy resin (EPON828, Shell Chemicals, Ltd.), and the mixture was mixed for 5 minutes in a small size stone mill machine, to prepare a novel naphthoxazine composition.

Figure 2:
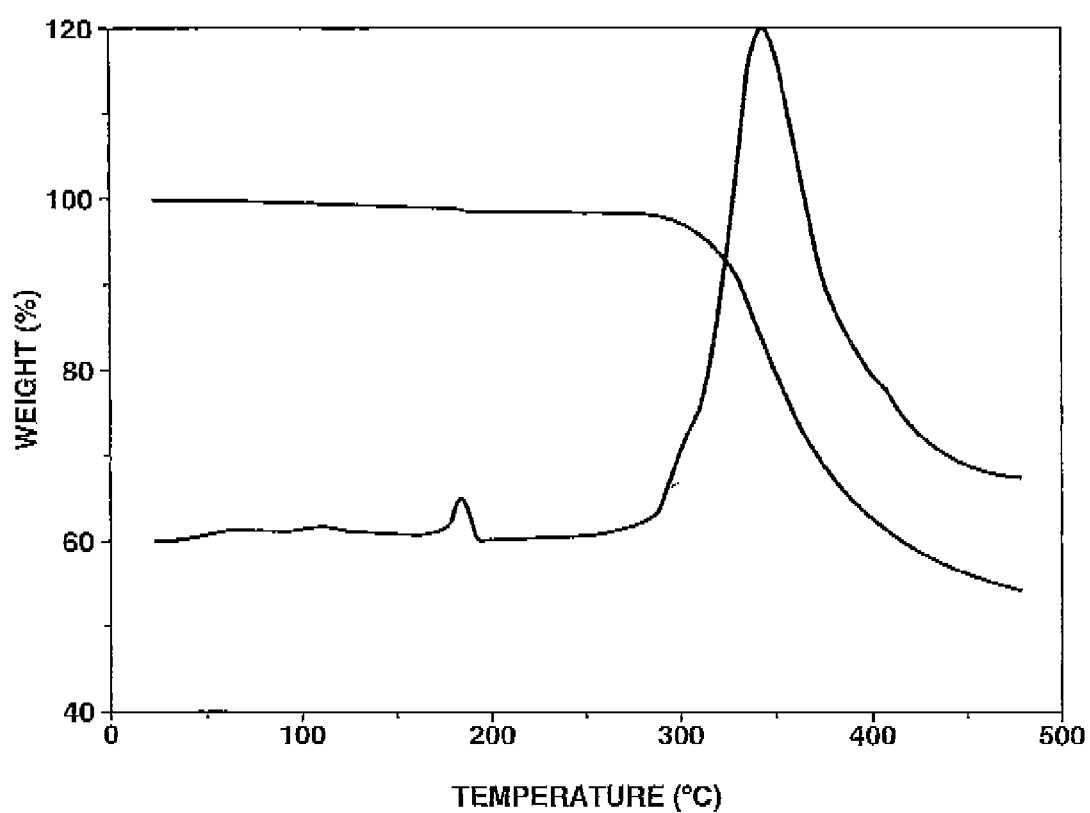
FIG. 2 shows a curve for weight reduction upon curing by heating (TGA) of the novel naphthoxazine composition of Example 1.

The weight reduction of this composition upon curing by heating (TGA) is shown in FIG. 2.

Weight reduction was hardly recognized in the region where curing is suspected to occur (150 to 200° C.).

[Production of Sheet]

The novel naphthoxazine composition prepared in the above was placed under a hot press releasably treated and controlled to a temperature of 180° C., and was subjected to curing by heating for 10 minutes without pressurizing. Then, the resultant was cooled.

The novel naphthoxazine composition was molded into a sheet having a thickness of 0.1 mm.

The tensile strength of this sheet was measured (Table 1).

Comparative Example 1

A sample was produced in the same manner as in Example 1, except that the epoxy resin used in Example 1 was not added, and the same measurements were carried out.

The weight reduction of this sample upon curing by heating was approximately 8% (by weight).

Comparative Example 2

Figure 3:
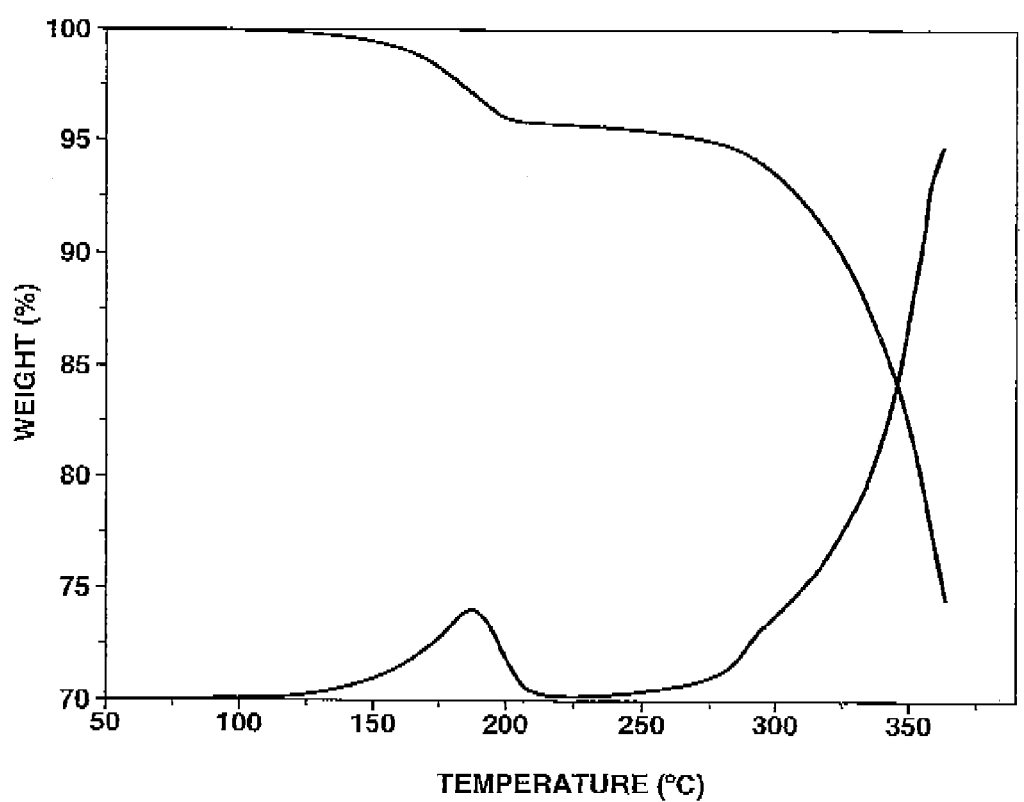
FIG. 3 shows a curve for weight reduction upon curing by heating (TGA) of a mixed composition of a conventional naphthoxazine and an epoxy resin of Comparative Example 2.

A sample was produced in the same manner as in Example 1, except that as for the amine used in Example 1, 18.6 g of aniline was used instead of 4-aminophenol, and the same measurements were carried out. The weight reduction of this sample upon curing by heating was approximately 6% (FIG. 3).

The above-obtained results are presented in Table 1.

TABLE 1

| | Weight reduction upon curing by heating | Tensile strength |
|---|---|---|
| Example 1 | 0.5% | 60 MPa |
| Comparative Example 1 | 8% | 45 MPa |
| Comparative Example 2 | 6% | 53 MPa |

As it is obvious from the above results, the novel naphthoxazine composition of the invention exhibits almost no weight reduction upon curing by heating, and forms a composition which does not allow void generation therein. For this reason, a composition also having excellent mechanical properties such as tensile strength can be obtained.

What is claimed is:

1. A naphthoxazine composition comprising a naphthoxazine compound having a terminal aromatic moiety bearing a hydroxyl group in the same molecule, and an epoxy resin added thereto; wherein the naphthoxazine compound is synthesized by mixing a hydroxynaphthalene, an amine and formaldehyde, adding a solvent if necessary, and heating the mixture while stirring; wherein the amine is an aromatic monoamine having a primary amino group and an optional hydroxyl group.

2. A molded product obtained by molding the naphthoxazine composition according to claim 1.

3. The naphthoxazine composition according to claim 1, wherein the mixing proportion of the naphthoxazine compound and the epoxy resin is a proportion adjusted such that the mole number of naphthoxazine functional group in the naphthoxazine compound/the mole number of epoxy function group in the epoxy resin is 0.3 to 3.0.

4. A molded product obtained by molding the naphthoxazine composition according to claim 3.

5. A naphthoxazine composition comprising an epoxy resin and a naphthoxazine compound having at least one terminal aromatic moiety bearing a hydroxyl group, said naphthoxazine compound selected from the group consisting of:

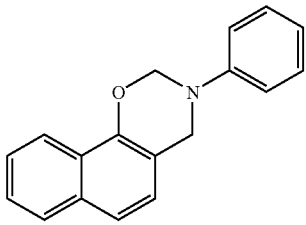

wherein one terminal aromatic moiety bears a hydroxyl group,

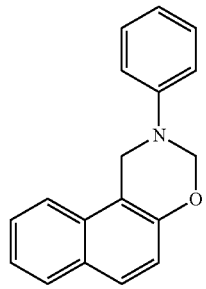

wherein one terminal aromatic moiety bears a hydroxyl group,

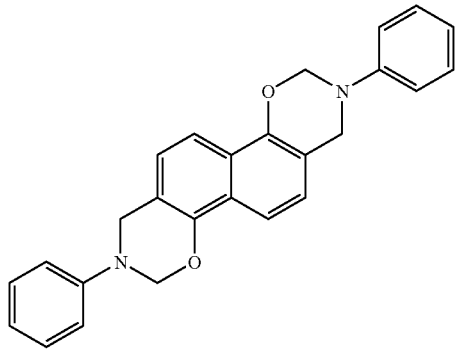

wherein both terminal aromatic moieties bear a hydroxyl group,

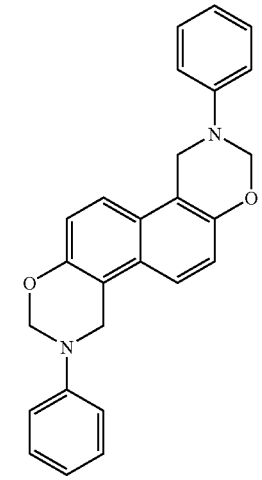

wherein both terminal aromatic moieties bear a hydroxyl group, and

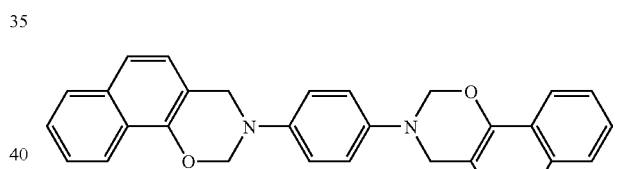

wherein both terminal aromatic moieties bear a hydroxyl group.

6. The naphthoxazine composition according to claim 5, wherein the mixing proportion of the naphthoxazine compound and the epoxy resin is a proportion adjusted such that the mole ratio of hydroxyl groups in the naphthoxazine compound to the epoxy groups in the epoxy ranges from 0.3 to 3.0.

* * * * *